US007924876B2

(12) United States Patent
Rezaei et al.

(10) Patent No.: US 7,924,876 B2
(45) Date of Patent: Apr. 12, 2011

(54) TIME SLICING AND STATISTICAL MULTIPLEXING IN A DIGITAL WIRELESS NETWORK

(75) Inventors: Mehdi Rezaei, Tampere (FI); Imed Bouazizi, Tampere (FI); Moncef Gabbouj, Tampere (FI)

(73) Assignee: Nokia Corporation, Espoo (FI)

( * ) Notice: Subject to any disclaimer, the term of this patent is extended or adjusted under 35 U.S.C. 154(b) by 909 days.

(21) Appl. No.: 11/756,096

(22) Filed: May 31, 2007

(65) Prior Publication Data

US 2008/0298337 A1 Dec. 4, 2008

(51) Int. Cl.
*H04J 3/16* (2006.01)

(52) U.S. Cl. ........................................................ 370/468

(58) Field of Classification Search ........................ None
See application file for complete search history.

(56) References Cited

U.S. PATENT DOCUMENTS

| | | | | |
|---|---|---|---|---|
| 7,194,758 | B1 * | 3/2007 | Waki et al. | 725/141 |
| 7,624,418 | B2 * | 11/2009 | Lee et al. | 370/442 |
| 2003/0166392 | A1 * | 9/2003 | Laiho et al. | 455/3.06 |
| 2007/0002870 | A1 * | 1/2007 | Pekonen et al. | 370/395.42 |
| 2007/0074264 | A1 * | 3/2007 | Vesma et al. | 725/135 |
| 2008/0225838 | A1 * | 9/2008 | Vesma et al. | 370/375 |

* cited by examiner

*Primary Examiner* — Anh-Vu Ly
(74) *Attorney, Agent, or Firm* — Banner & Witcoff Ltd.

(57) ABSTRACT

In accordance with an aspect of the invention, flexible burst boundaries, within an allowable range, allow statistical multiplexing to be performed in conjunction with time slicing in a digital broadcast network. The signalling of the delta-t is performed such that data of the service is not missed. Similar to deterministic multiplexing, aspects of the invention split the multiplex into several time-cycles and allocate, for each service, a time slot (data burst) from the total time-cycle according to the service's average bit rate. In accordance with aspects of the invention, however, the boundaries of each data burst are allowed to grow or shrink by a limited amount.

30 Claims, 8 Drawing Sheets

OSI Reference Model

TIME SLICING AND STATISTICAL MULTIPLEXING IN A DIGITAL WIRELESS NETWORK

FIELD OF THE INVENTION

The invention relates to time slicing and statistical multiplexing in a digital wireless network.

BACKGROUND OF THE INVENTION

Digital wireless networks enable end users to receive digital content including video, audio, data, and so forth. Using a mobile terminal, a user may receive digital content over a wireless digital network, e.g. a broadcast or multicast network. Digital content can be transmitted in a cell within a network. A cell may represent a geographical area that may be covered by a transmitter in a communication network. A network may have multiple cells and cells may be adjacent to other cells.

A receiver device, such as a mobile terminal, may receive a program or service in a data or transport stream. The transport stream carries individual elements of the program or service such as the audio and video components of a program or service or data in a software distribution. An elementary stream may carry at least a single program or service, i.e. a subset of the data stream. Typically, the receiver device locates the different components of a particular program or service in a data stream through Program Specific Information (PSI) or Service Information (SI) embedded in the data stream.

Digital Video Broadcasting for Handheld terminals (DVB-H) is an ETSI standard specification for bringing broadcast services to battery-powered handheld receivers [ETSI, "Digital Video Broadcasting (DVB): Transmission Systems for Handheld Terminals," ETSI standard, EN 302 304 V1.1.1, 2004.]. DVB-H is largely based on the successful DVB-T specification for digital terrestrial television, adding to it a number of features designed to take into account the limited battery life of small handheld devices, and the particular environments in which such receivers typically operate.

To reduce the power consumption in handheld terminals, the service data may be time-sliced (like in DVB-H) and then it is sent into the channel as bursts at a significantly higher bit rate than the bit rate of the audio-visual service. Time-slicing enables a receiver to become inactive to conserve battery power while the receiver is not receiving bursts of a requested service.

To indicate to the receiver when to expect the next burst, the time (delta-t) to the beginning of the next burst is indicated within the burst. Between the bursts, data of the elementary stream is not transmitted, allowing other elementary streams to use the bandwidth.

Time-slicing also supports the possibility to use the receiver to monitor neighboring cells during the off-times (between bursts). By accomplishing the switching of the reception from one transport stream to another during an off period, it is possible to accomplish a quasi-optimum handover decision as well as seamless service handover.

DVB-H also employs additional forward error correction (MPE-FEC) to further improve mobile and indoor reception performance of DVB-T. Time-Slicing and MPE-FEC are implemented in a network element called an Internet Protocol (IP) Encapsulator.

Statistical multiplexing (StatMux) is a type of communication link sharing. In statistical multiplexing, a fixed bandwidth communication channel is divided into several variable bit-rate digital channels. The link sharing is adapted to the instantaneous traffic demands of the data streams that are transferred over each channel. This is an alternative to creating a fixed sharing of a link, such as in general time division multiplexing. Statistical Multiplexing is used in many communication applications to improve the overall performance of communication channels. StatMux can improve the overall performance of communication channels by sharing the network resources between a number of services thereby potentially adversely affecting channel capacity usage, transmission delay, and drop rate. In digital video communication applications in which variable bit rate video is used to enhance the video quality, usage of StatMux can remarkably improve the performance of communication networks. Due to the time-slicing transmission scheme in DVB-H, the implementation of StatMux in DVB-H is significantly different from other applications and has some associated difficulties.

As such, techniques for performing statistical multiplexing in conjunction with time-slicing in a digital broadcast network, such as one that uses Internet Protocol datacasting (IPDC) over DVB-H, would advance the art.

BRIEF SUMMARY OF THE INVENTION

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

In accordance with an aspect of the invention, flexible burst boundaries, within an allowable range, allow statistical multiplexing to be performed in conjunction with time slicing in a digital wireless network. The signalling of the delta-t is performed such that data of the service is not missed. Similar to deterministic multiplexing, aspects of the invention split the multiplex into several time-cycles and allocate, for each service, a time slot (data burst) from the total time-cycle according to the service's average bit rate. In accordance with aspects of the invention, however, the boundaries of each data burst are allowed to grow or shrink by a limited amount.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Figure 1:
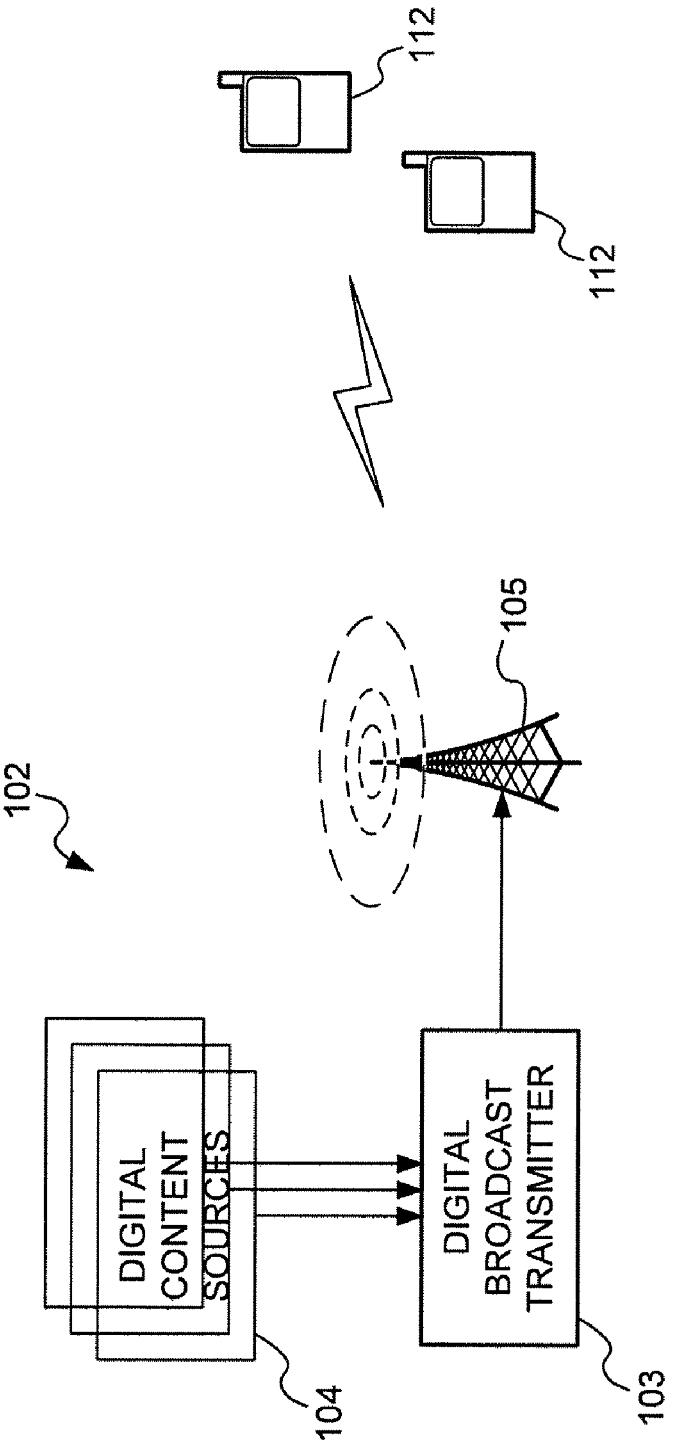
FIG. 1 illustrates a suitable digital broadband broadcast system in which one or more illustrative embodiments of the invention may be implemented.

FIG. 1 illustrates a suitable digital wireless system 102 in which one or more illustrative embodiments may be implemented. Systems such as the one illustrated here may utilize a digital broadband broadcast or multicast technology, for example Digital Video Broadcast—Handheld (DVB-H) or next generation DVB-H networks. Examples of other digital broadcast standards which digital broadband broadcast system 102 may utilize include Digital Video Broadcast—Terrestrial (DVB-T), Integrated Services Digital Broadcasting—Terrestrial (ISDB-T), Advanced Television Systems Committee (ATSC) Data Broadcast Standard, Digital Multimedia Broadcast-Terrestrial (DMB-T), Terrestrial Digital Multimedia Broadcasting (T-DMB), Satellite Digital Multimedia Broadcasting (S-DMB), Forward Link Only (FLO), Digital Audio Broadcasting (DAB), and Digital Radio Mondiale (DRM). Other digital broadcasting standards and techniques, now known or later developed, may also be used. Aspects of the invention may also be applicable to other multicarrier digital broadcast systems such as, for example, T-DAB, T/S-DMB, ISDB-T, and ATSC, proprietary systems such as Qualcomm MediaFLO/FLO, and non-traditional systems such 3GPP MBMS (Multimedia Broadcast/Multicast Services) and 3GPP2 BCMCS (Broadcast/Multicast Service). The digital wireless system 102 may also contain a back channel (not shown) for user requests or user feedback. The back channel may be a dedicated channel for use in the digital wireless system, or it may be a channel of a further system, e.g. of a cellular telephony system (GSM, WCDMA etc.) or the like (WLAN etc.).

Digital content may be created and/or provided by digital content sources 104 and may include video signals, audio signals, data, and so forth. Digital content sources 104 may provide content to digital broadcast transmitter 103 in the form of digital packets, e.g., Internet Protocol (IP) packets. A group of related IP packets sharing a certain unique IP address or other source identifier is sometimes described as an IP stream. Digital broadcast transmitter 103 may receive, process, and forward for transmission multiple IP streams from multiple digital content sources 104. The processed digital content may then be passed to digital broadcast tower 105 (or other physical transmission component) for wireless transmission. Ultimately, mobile terminals or devices 112 may selectively receive and consume digital content originating from digital content sources 104.

Figure 2:
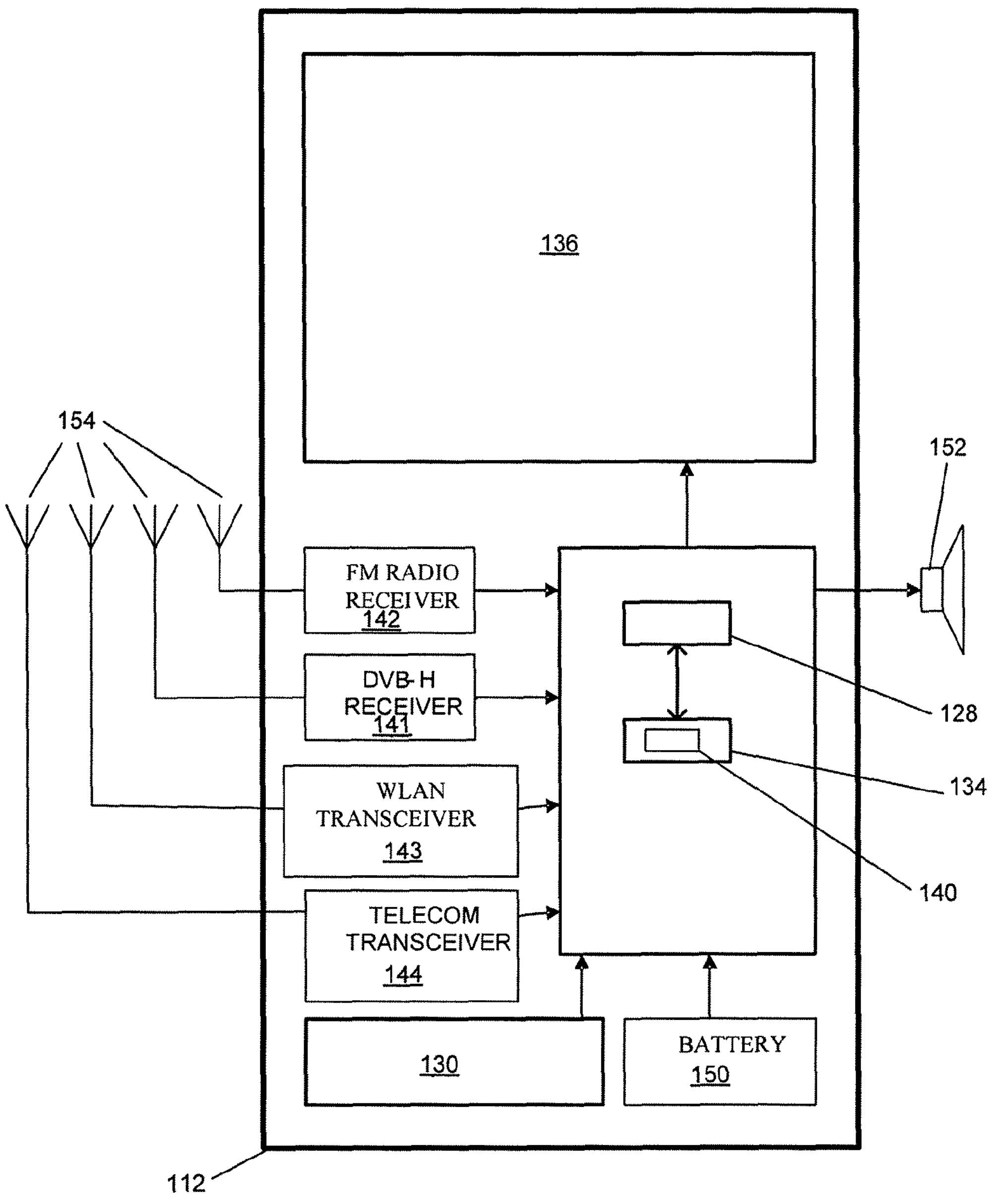
FIG. 2 illustrates an example of a mobile device in accordance with an aspect of the present invention.

As shown in FIG. 2, mobile device 112 may include processor 128 connected to user interface 130, memory 134 and/or other storage, and display 136, which may be used for displaying video content, service guide information, and the like to a mobile-device user. Mobile device 112 may also include battery 150, speaker 152 and antennas 154. User interface 130 may further include a keypad, display, voice interface, one or more arrow keys, joy-stick, data glove, mouse, roller ball, touch screen, or the like.

Computer executable instructions and data used by processor 128 and other components within mobile device 112 may be stored in a computer readable memory 134. The memory may be implemented with any combination of read only memory modules or random access memory modules, optionally including both volatile and nonvolatile memory. Software 140 may be stored within memory 134 and/or storage to provide instructions to processor 128 for enabling mobile device 112 to perform various functions. Alternatively, some or all of mobile device 112 computer executable instructions may be embodied in hardware or firmware (not shown).

Mobile device 112 may be configured to receive, decode and process digital transmissions that are based, for example, on the Digital Video Broadcast (DVB) standard, such as DVB-H or DVB-T, through a specific DVB receiver 141. The mobile device may also be provided with other types of receivers for digital broadband broadcast transmissions. Additionally, receiver device 112 may also be configured to receive, decode and process transmissions through FM/AM Radio receiver 142, WLAN transceiver 143, and telecommunications transceiver 144. In one aspect of the invention, mobile device 112 may receive radio data stream (RDS) messages.

In an example of the DVB standard, one DVB 10 Mbit/s transmission may have 200, 50 kbit/s audio program channels or 50, 200 kbit/s video (TV) program channels. The mobile device 112 may be configured to receive, decode, and process transmission based on the Digital Video Broadcast-Handheld (DVB-H) standard or other DVB standards, such as DVB-Satellite (DVB-S), or DVB-Terrestrial (DVB-T). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting—Terrestrial), DAB (Digital Audio Broadcasting), DMB (Digital Multimedia Broadcasting), FLO (Forward Link Only) or DIRECTV. Additionally, the digital transmission may be time sliced, such as in DVB-H technology. Time-slicing may reduce the average power consumption of a mobile terminal and may enable smooth and seamless handover. Time-slicing entails sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation.

In addition, an electronic service guide may be used to provide program or service related information. Generally, an Electronic Service Guide (ESG) enables a terminal to communicate what services are available to end users and how the services may be accessed. The ESG includes independently existing pieces of ESG fragments. Traditionally, ESG fragments include XML and/or binary documents, but more recently they have encompassed a vast array of items, such as for example, a SDP (Session Description Protocol) description, textual file, or an image. The ESG fragments describe one or several aspects of currently available (or future) service or broadcast program. Such aspects may include for example: free text description, schedule, geographical availability, price, purchase method, genre, and supplementary information such as preview images or clips. Audio, video and other types of data including the ESG fragments may be transmitted through a variety of types of networks according to many different protocols. For example, data can be transmitted through a collection of networks usually referred to as the "Internet" using protocols of the Internet protocol suite, such as Internet Protocol (IP) and User Datagram Protocol (UDP). Data is often transmitted through the Internet addressed to a single user. It can, however, be addressed to a group of users, commonly known as multicasting. In the case in which the data is addressed to all users it is called broadcasting.

One way of broadcasting data is to use an IP datacasting (IPDC) network. IPDC is a combination of digital broadcast and Internet Protocol. Through such an IP-based broadcasting network, one or more service providers can supply different types of IP services including on-line newspapers, radio, and television. These IP services are organized into one or more media streams in the form of audio, video and/or other types of data. To determine when and where these streams occur, users refer to an electronic service guide (ESG). One type of DVB is Digital Video Broadcasting-Handheld (DVB-H).

DVB transport streams deliver compressed audio and video and data to a user via third party delivery networks. Moving Picture Expert Group (MPEG) is a technology by which encoded video, audio, and data within a single program is multiplexed, with other programs, into a transport stream (TS). The TS is a packetized data stream, with fixed length packets, including a header. The individual elements of a program, audio and video, are each carried within packets having a unique packet identification (PID). To enable a receiver device to locate the different elements of a particular program within the TS, Program Specific Information (PSI), which is embedded into the TS, is supplied. In addition, additional Service Information (SI), a set of tables adhering to the MPEG private section syntax, is incorporated into the TS. This enables a receiver device to correctly process the data contained within the TS.

As stated above, the ESG fragments may be transported by IPDC over a network, such as for example, DVB-H to destination devices. The DVB-H may include, for example, separate audio, video and data streams. The destination device must then again determine the ordering of the ESG fragments and assemble them into useful information.

Figure 3:
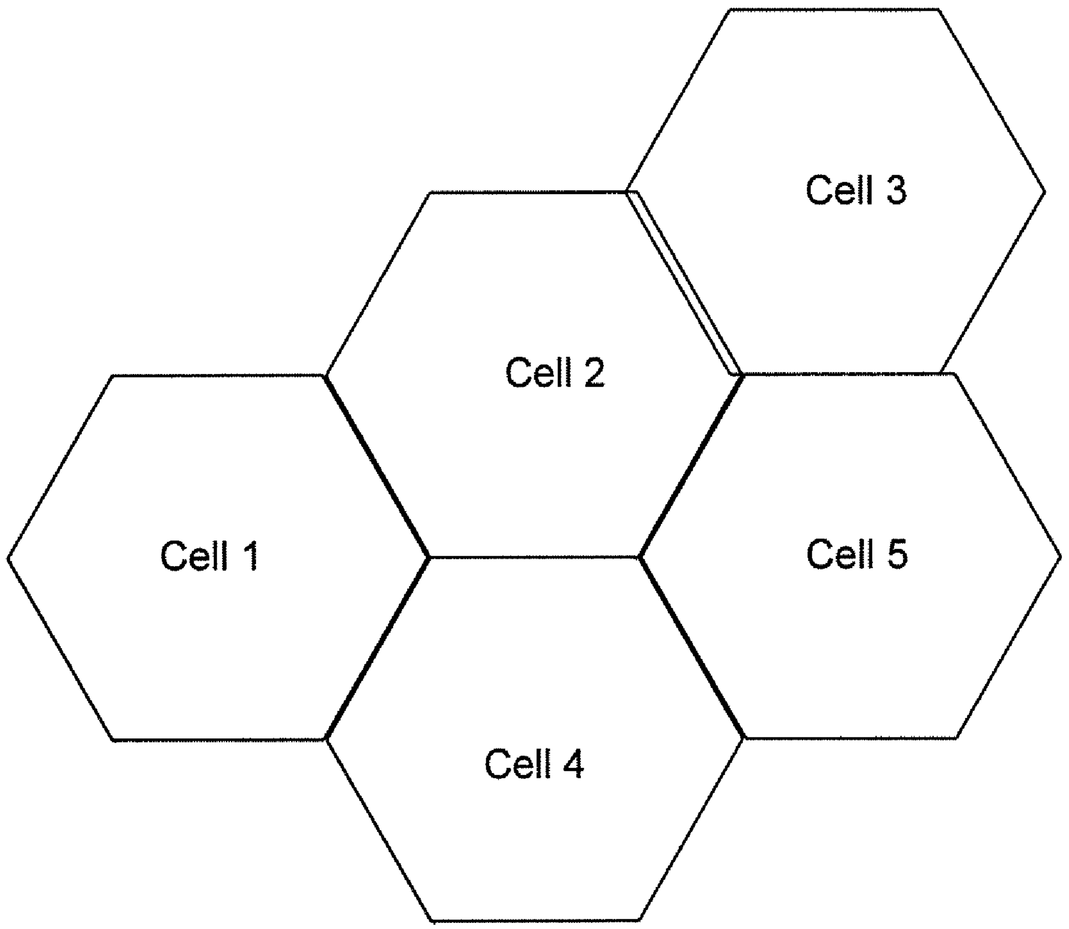
FIG. 3 illustrates an example of cells, each of which may be covered by a different transmitter in accordance with an aspect of the present invention.

In a typical communication system, a cell may define a geographical area that may be covered by a transmitter. The cell may be of any size and may have neighboring cells. FIG. 3 illustrates schematically an example of cells, each of which may be covered by a different transmitter. In this example, Cell 1 represents a geographical area that is covered by a transmitter for a communication network. Cell 2 is next to Cell 1 and represents a second geographical area that may be covered by a different transmitter. Cell 2 may, for example, be a different cell within the same network as Cell 1. Alternatively, Cell 2 may be in a network different from that of Cell 1. Cells 1, 3, 4, and 5 are neighboring cells of Cell 2, in this example.

Figure 4:
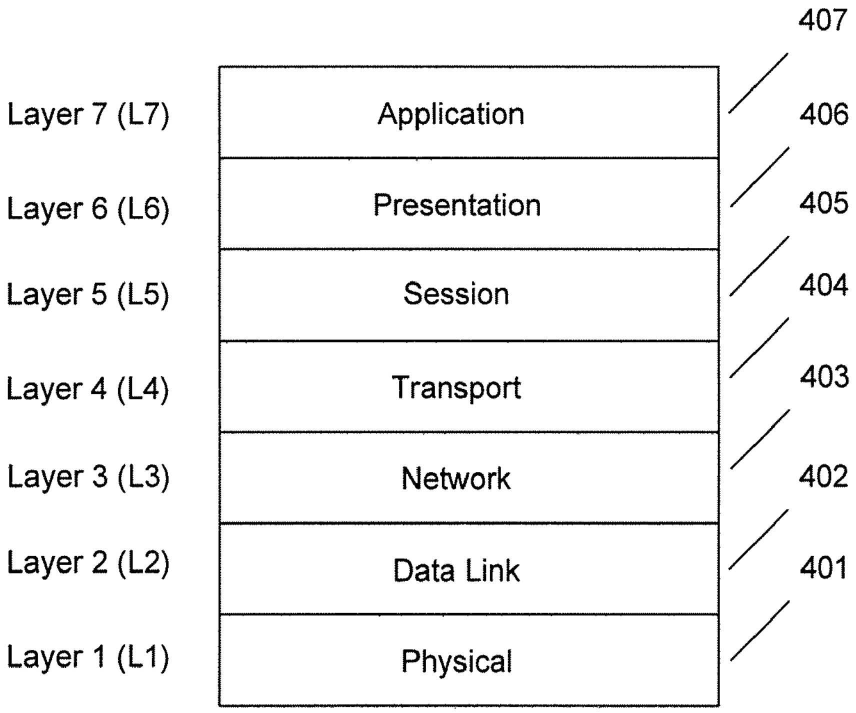
FIG. 4 illustrates the OSI reference model as containing seven layers.

Communication between network components may be accomplished via the Open Systems Interconnection (OSI) standard. The OSI framework of the process for communication between different network components may be structured as seven layers or categories as described by the OSI reference model. FIG. 4 illustrates the OSI reference model as containing seven layers. Typically, layers 4-7 pertain to end-to-end communications between message source and message destination and layers 1-3 pertain to network access. Layer 1 (401, the physical layer) deals with the physical means of sending data over lines. This may include, for example, electrical, mechanical or functional control of data circuits. Layer 2 (402, the data link layer) pertains to procedures and protocols for operating communication lines. Also, detection and correction of message errors may be accomplished in Layer 2. Layer 3 (403, network layer) determines how data is transferred between different network components. Also, Layer 3 (403) may address routing in networks. Layer 4 (404, Transport layer) pertains to defining rules for information exchange. Layer 4 (404) may also be involved in the end-to-end delivery of information within and between networks. This information may further include error recovery and flow control. Layer 5 (405, Session layer) pertains to dialog management in Layer 5 (405) and may control use of basic communications facilities provided by Layer 4 (404, transport layer). Layer 6 (406, presentation layer) pertains to providing compatible interactivity between data formats. Layer 7 (407, application layer) provides functions for particular applications services. These functions may include file transfer, remote file access and/or virtual terminals.

Statistical multiplexing in a digital broadcast network may be implemented by an IP encapsulator. Multiplexed services may share the bits in one time slice or they may share the time via separate time-slices. When the multiplexed services share the bits in one time slice, a number of services can be encapsulated to one MPE-FEC and time-slice. When the multiplexed services share the time, as a simple case each service can be encapsulated to one MPE-FEC and time slice and the transmission channel is shared between time-slices as TDM (Time Division Multiplexing). Aspects of the invention are directed to statistical multiplexing using TDM in which a one service is encapsulated to one time-slice, as opposed to multiple services being encapsulated to a particular time-slice.

In order to indicate to the receiver when to expect a next burst in a digital broadcast network, the time (delta-t) to the beginning of the next burst is indicated within the current burst. Between the bursts, data of the elementary stream is not transmitted, allowing other elementary streams to use the bandwidth. In deterministic multiplexing (DetMux) the whole bandwidth may be allocated to a number of services with fixed burst sizes and determined delta-t. But, in statistical multiplexing, the burst sizes and the duration of time-slices may vary with time according to the temporal bit rates of service bit streams. The problem that arises due to the variation over time of the duration of time-slices related to multiplexed services is how to calculate the delta-t for each service.

A desired statistical multiplexer should know the required bandwidth for each service in the next time-cycle when the current time-cycle is time-sliced. This is possible with a long-time look ahead or by buffering of service data for a relatively long-time before encapsulating. Buffering a lot of data, however, imposes a long delay to the system that is in contradiction with the goals of StatMux. As such, aspects of the invention are directed to time-slicing and statistical multiplexing in which delta-t is computed with no look ahead and no special buffering.

In accordance with various aspects of the invention, flexible burst boundaries, within an allowable range, allow statistical multiplexing to be performed in conjunction with time slicing a digital broadcast network. The signalling of the delta-t is performed such that data of the service is not missed. Data from the previous service, however, might be received and discarded or used for another purpose. Similar to deterministic multiplexing, aspects of the invention split the multiplex into several time-cycles and allocate, for each service, a time slot (data burst) from the total time-cycle according to the service's average bit rate. In accordance with aspects of the invention, however, the boundaries of each data burst are allowed to grow or shrink by a limited amount. This allows for allocating data to the services that temporarily can use more space than they normally do.

Figure 5:
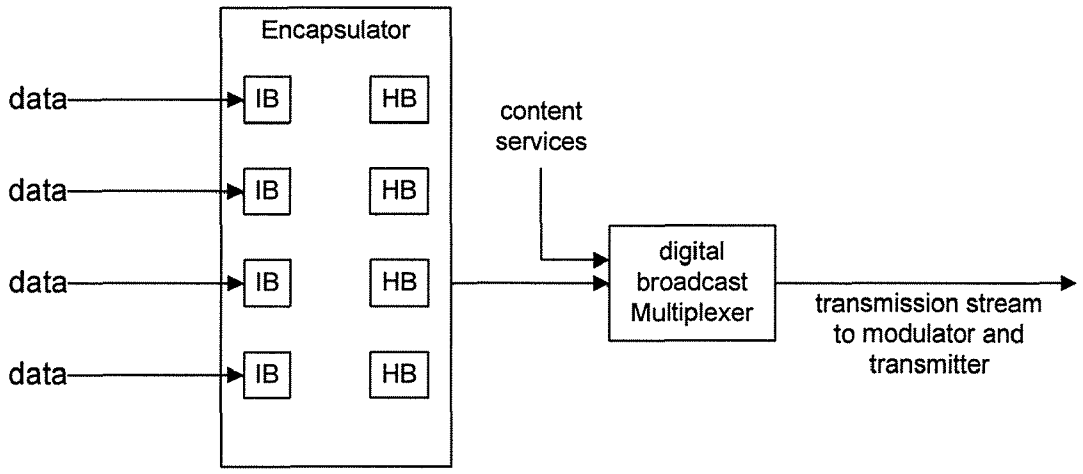
FIG. 5 is a schematic diagram of a data encapsulator and digital broadcast multiplexer in accordance with an aspect of the invention.

FIG. 5 is a schematic diagram of a data encapsulator and digital broadcast multiplexer in accordance with an aspect of the invention. Statistical multiplexing may be performed by a data encapsulator, such as an IP encapsulator, in accordance with an aspect of the invention. As shown in FIG. 5, the IP encapsulator may receive IP packets that belong to a number of services which are going to be encapsulated and transported in the multiplex. A number of services, as well as an average bit rate of each service, may be planned such that the available bandwidth is substantially completely used. A significant part of the transmission channel bandwidth is typically used for the multiprotocol encapsulation forward error correction (MPE-FEC) code, MPE protocol overhead, transmission stream (TS) protocol overhead, and the program specific information/service information (PSI/SI) signaling. A relatively small percentage of each MPE-FEC frame may be useless because the IP packets do not typically fit exactly into the application data table of the MPE-FEC frame. The remaining bandwidth is available to be allocated to IP packets of the digital-broadcast-network services.

A fixed time-cycle (T) may be determined for each service based on the channel bandwidth, average bit rate of services, and the desired percentage of power saving for the receivers. Techniques for making such a determination are well known in the art and are explained in more detail in the ETSI standard document EN 301192.

For each service, an Average_Time_Slice_Duration may be computed as:

$$\overline{T}_n = \frac{R_n T}{R_1 + R_2 + \ldots + R_n + \ldots + R_N}$$

where $\overline{T_n}$ denotes the Average_Time_Slice_Duration of service n. $R_n$ represents the average bit rate of service n and N stands for the number of services, and T denotes the time-cycle.

The time line during transmission is partitioned into the fixed time-cycles (T).

An order for the services in the time-cycle may be determined based on descending service priorities of the services. The reasons for the service ordering will be discussed below.

The delta-t for the first service in the time-cycle is computed as $$\Delta t_1 = T$$

where $\Delta t_1$ denotes delta-t (i.e., the time until a start of a next transmission) of the first service in the time-cycle. The delta-t for the other services in the time-cycle is computed as:

$$\Delta t_n = (m+1)T - t_{current} + \sum_{i=1}^{n-1} \overline{T}_i - \delta_{n-1} \,\Big|\, n = 2 \ldots N$$

where m denotes the actual time-cycle and $t_{current}$ is the current time (starting from 0 at the beginning of the first time-cycle). Due to the StatMux, the time-slice durations have some variations. $\delta_i$ is a relatively small time duration that corresponds to uncertainty in the duration of time-slices of service i. During a time duration equal to $\delta_{n-1}$ before $\Delta t_n$, the receiver of service n is switched on but sometimes there is no data to receive in this time duration. Data transmission of service n is started when data transmission of service n−1 is ended. Methods for calculating $\delta_n$ are discussed below.

A maximum value and a minimum value for time slice duration of each service are defined as below.

For the first service:

$$T_1^{min} = \overline{T}_1 - \delta_1,\ T_1^{max} = \overline{T}_1 + \delta_1$$

For the middle services, the above values are altered according to their start time, which depends on the end time of the previous service. In accordance with an aspect of the invention, each service is considered to be a middle service, unless it is the first service of a time-cycle or the last service of a time-cycle.

For the last service, to use the whole available band width the following condition should be met:

$$\sum_{i=1}^{N} T_i = T$$

Where $T_i$ represents the real duration of the time slice of service i.

Therefore $$T_N = T_N^{min} = T_N^{max} = T - \sum_{i=1}^{N-1} T_i$$

The IP packets received by the IP Encapsulator are stored in a small size buffer or in a number of N separate buffers corresponding to the services.

The IP packets related to service n are fetched by the IP encapsulator to be encapsulated in time-slice n in accordance with the following rules:

A Target_Time_Stamp is defined for media bit streams in the current time-slice based on the time-cycle T and the previous Target_Time_Stamp (in the previous time-cycle).

The IP packets related to the service n are fetched to the encapsulator to reach the Target_Time_Stamp while the condition $T_n^{min} \leqq T_n \leqq T_n^{max}$ should be met.

If the fetched IP packets fill the time-slice to $T_n^{max}$ and the time-stamp of last fetched packets are close to the Target_Time_Stamp, the packet fetching is stopped before reaching the Target_Time_Stamp. A timestamp is considered to be close to the Target_Time_Stamp if Target_Time_Stamp−Timestamp<Δ, where Δ is a constant that is proportional to one frame duration of a media.

If the fetched IP packets fill the time-slice to $T_n^{max}$ and the time-stamp of last fetched packets are significantly lower than the Target_Time_Stamp, a number of packets with older time-stamps can be dropped and more packets with newer time stamps can be fetched. A timestamp is considered significantly lower than the Target_Time_Stamp if Target_Time_Stamp−Timestamp>c*Δ, where c is a constant and Δ is a constant proportional to one frame duration of the media.

If the Target_Time_Stamp is reached but the fetched IP packets do not fill the time-slice to $T_n^{min}$, more packets are fetched to fill up the data burst up to at least $T_n^{min}$.

If the fetched IP packets do not fill the time-slice to $T_n^{min}$ and there are no more packets in the buffer, padding is used and the min time-slice duration $T_n^{min}$ is used as the end of the current time slice.

As will be apparent, other suitable time-slice filling criteria may also be used. For example, each burst packet may be filled as much as possible as long as data is available, so as to maintain a calculated maximum level. As another example, packets may be filled to a level so as to take into account the current bit rate of each service (as compared to the "average bit rate"), so that if the current bit rate of a service is larger than the average bit rate, then the size of the packet may be increased (within predefined limits). This would facilitate balancing of bandwidth use among various services that currently have different bit rates. As another example, an attempt may be made to keep the Target_Time_Stamp, which more or less reflects the actual data need of the service. For example, a target time stamp may be 2 seconds, which corresponds to the time-cycle. In each burst, an attempt is made to include 2 seconds worth of data. Sometimes this results in a long burst and sometimes it results in a short burst.

The fetched packets are encapsulated and transmitted.

The described StatMux algorithm permits some variations in the temporal allocated band width to the digital broadcast services proportional to their bit rates. The permitted variations depend on the order of the services within the time-cycle as well as on the values of $\delta_n$. The range of permitted variations for the service n may be controlled by the location of service in the time-cycle and by the values of $\delta_n$. A larger $\delta_n$ provides more flexibility in the allocated bandwidth. If $R_1=R_2= \ldots =R_N$ and $\delta_1=\delta_2= \ldots =\delta_N$, the earlier services in the time-cycle can have more variations than later services. This means the order of services in the time-cycle establishes a kind of prioritization for the service multiplexing. This prioritization may be utilized as a useful feature, or it can be compensated for by unequal values for the $\delta_n$ such that $\delta_1<\delta_2< \ldots <\delta_N$. Generally $\delta_n$ can be defined as a percentage of $\overline{T_n}$, a good selection of $\delta_n$ could be around 30% of $\overline{T_n}$. As will be apparent, other suitable percentages may also be used. Selecting larger values for $\delta_n$ improves the performance of StatMux. But it increases the power consumption of the receiver that should be switched on for longer time-periods. The typical increase in the receiver power consumption, however, is relatively small. For example, if $R_1=R_2= \ldots =R_N$ and $\delta_1=\delta_2= \ldots =\delta_N$, the percentage of power saving for the radio reception parts in the receivers in average on all services decrease as:

$$\begin{aligned}\text{Decrease\_in\_Percentage\_of\_Power\_Saving} &= \frac{N-1}{N}\cdot\frac{R_n}{R}\cdot\frac{\delta_n}{\overline{T}_n}\cdot 100\\ &= \frac{(N-1)}{N^2}\cdot\frac{\delta_n}{\overline{T}_n}\cdot 100\end{aligned}$$

e.g. $N=10$, $\delta_n/\overline{T}_n=0.3$ then $\text{Decrease\_in\_Percentage\_of\_Power\_Saving} = 2.7\%$.

With respect to the variation in how much time each service may use, each service will have between $T_i-\delta_i-\delta_{i-1}$ and $T_i+\delta_i+\delta_{i-1}$, except the first service, which has between $T_1-\delta_1$ and $T_1+\delta_1$, and the last service, which has between $T_n-\delta_n$ and $T_n+\delta_n$.

With respect to timing for the receiver to receive data bursts, in accordance with an aspect of the invention, receiver 1 (i.e., a receiver for a first service) starts reception of the m'th time slice at a multiple of the TDM frame time: (m−1)*T. Receiver n may start reception of its m'th time slice within the TDM frame at:

$$\sum_{i=1}^{n-1} T_i - \delta_n$$

Figure 6:
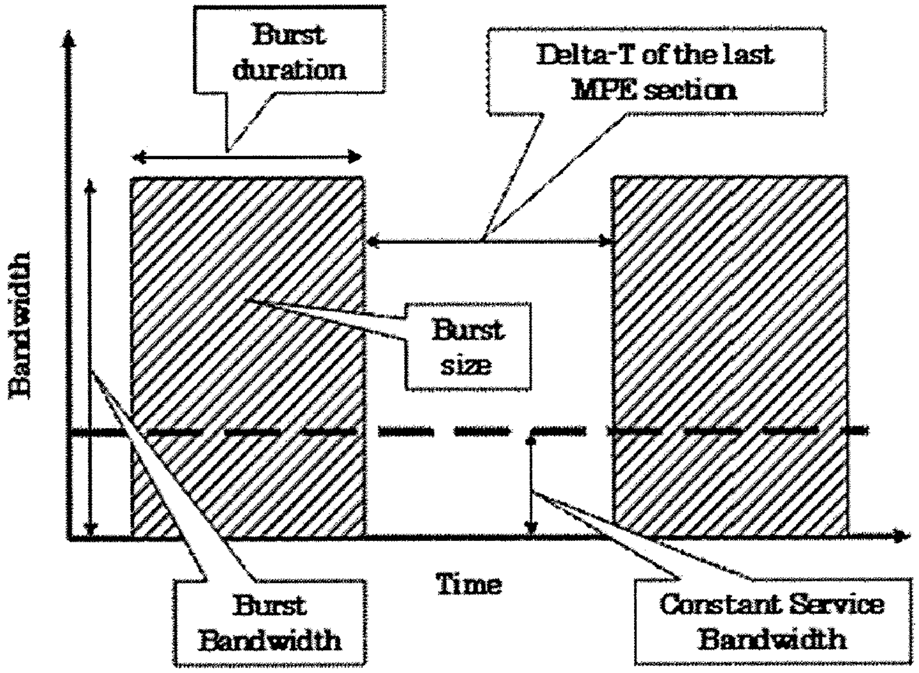
FIG. 6 shows signaling of delta-T of a last MPE section of a burst of data.

(as opposed to (n−1)*Ti for a completely determined time slicing). This earliest time would be indicated in the previous slot of the service. The indicated value may be corrected by the actual time of the current transmission. In the previous data burst, each MPE section may indicate the relative time to the start of the next burst. FIG. 6 shows signaling of delta-T of a last MPE section of a burst of data. Burst bandwidth is shown as being significantly greater than a corresponding constant service bandwidth for transmitting a comparable amount of data.

Figure 7:
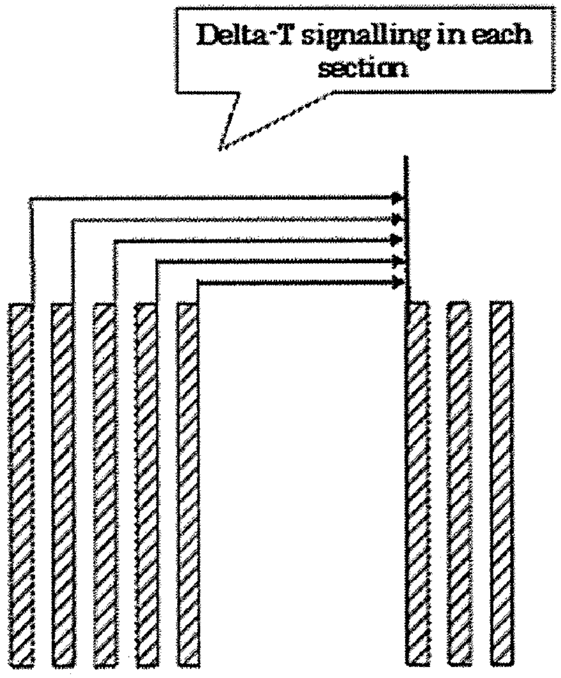
FIG. 7 shows delta-T signaling of MPE sections (encapsulating IP packets) of a first burst of data relative to the beginning of a next burst of data.

FIG. 7 shows delta-T signaling of MPE sections (encapsulating IP packets) of a first burst of data relative to the beginning of a next burst of data. Delta-T may represent the time from the start of a current MPE section to the start of a next burst of data. As such, with the transmission of successive packets of a current burst, respective delta-T values may be reduced accordingly.

Figure 8:
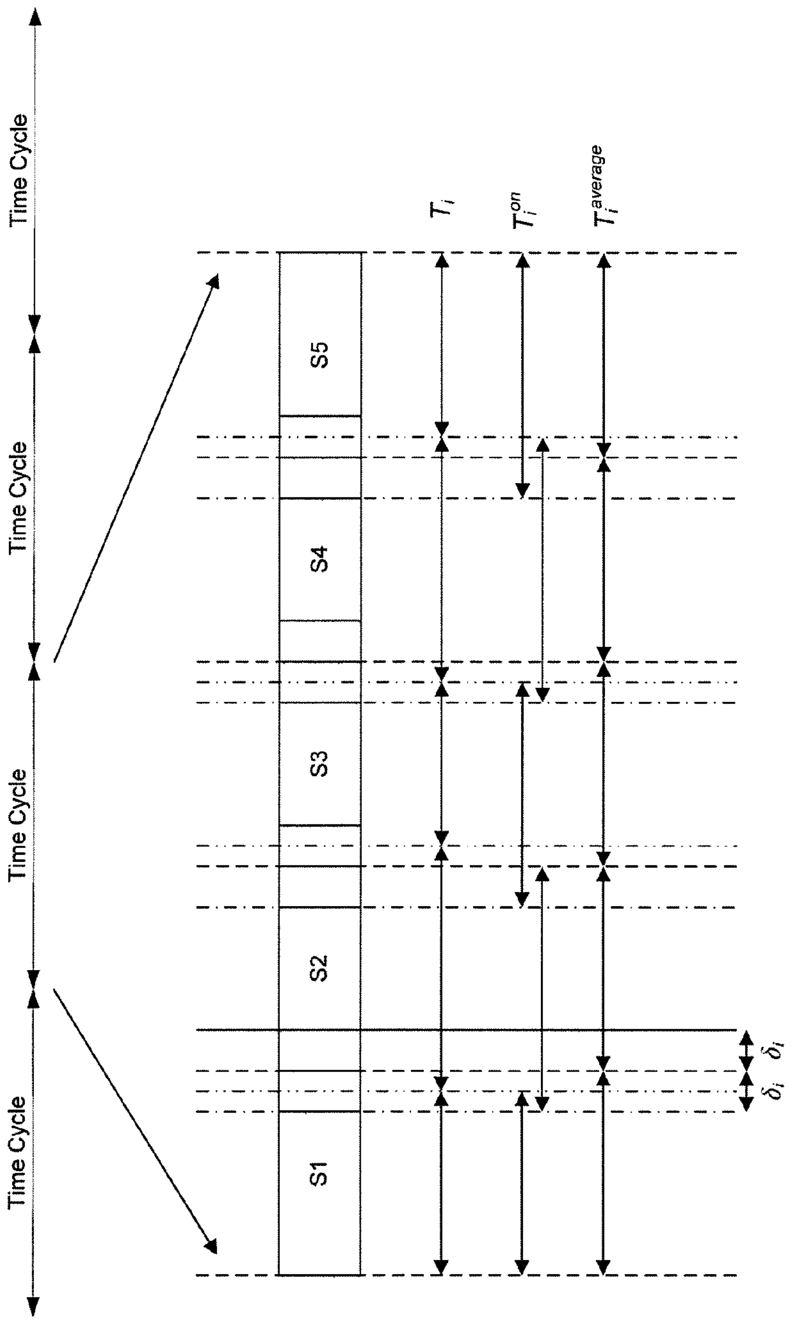
FIG. 8 is a schematic diagram showing time slice and time-cycle allocation in statistical multiplexing in accordance with an aspect of the invention.

FIG. 8 is a schematic diagram showing time slice and time-cycle allocation in statistical multiplexing in accordance with an aspect of the invention. The vertical lines with the dash-dot-dot pattern show the actual time slice start/end time. The horizontal row of double-headed arrows between these vertical lines is labeled $T_i$. The vertical lines with the dash-dot pattern show the time of switching on the digital-broadcast receiver. The horizontal rows of double-headed arrows between these vertical lines are labeled $T_i^{on}$. The vertical dashed lines show the time slice size based on the average bit rate. The horizontal row of double-headed arrows between these vertical lines is labeled $T_i^{average}$. $T_i$ is the real duration of burst i. $T_i^{average}$ is $T_i$ according to the above discussion and is the normal burst duration calculated based on the average bitrate of service i. $T_i^{on}$ is the time at which the receiver is switched on for burst i.

The StatMux algorithm discussed above may be used in conjunction with various types of protocols and digital broadcast networks, including but not limited to, IPDC over DVB-H. The algorithm provides a low complexity standard compliant StatMux method that improves the performance of digital broadcast networks and services. Furthermore, the proposed algorithm solves the problem of computing delta-t without any special buffering at the expense of a small increase in the power consumption of DVB-H receiver. As shown by simulation results, compared to deterministic multiplexing, a StatMux in accordance with various aspects of the invention can decrease the buffering delay of digital broadcast services by approximately 70% at the expense of about 3% higher power consumption for the radio reception parts in the receiver. The consumed power by the radio reception parts is a part of the whole consumed power by the receiver. This means that the overall increase in the receiver power consumption is lower than the 3% value indicated above.

Figure 9:
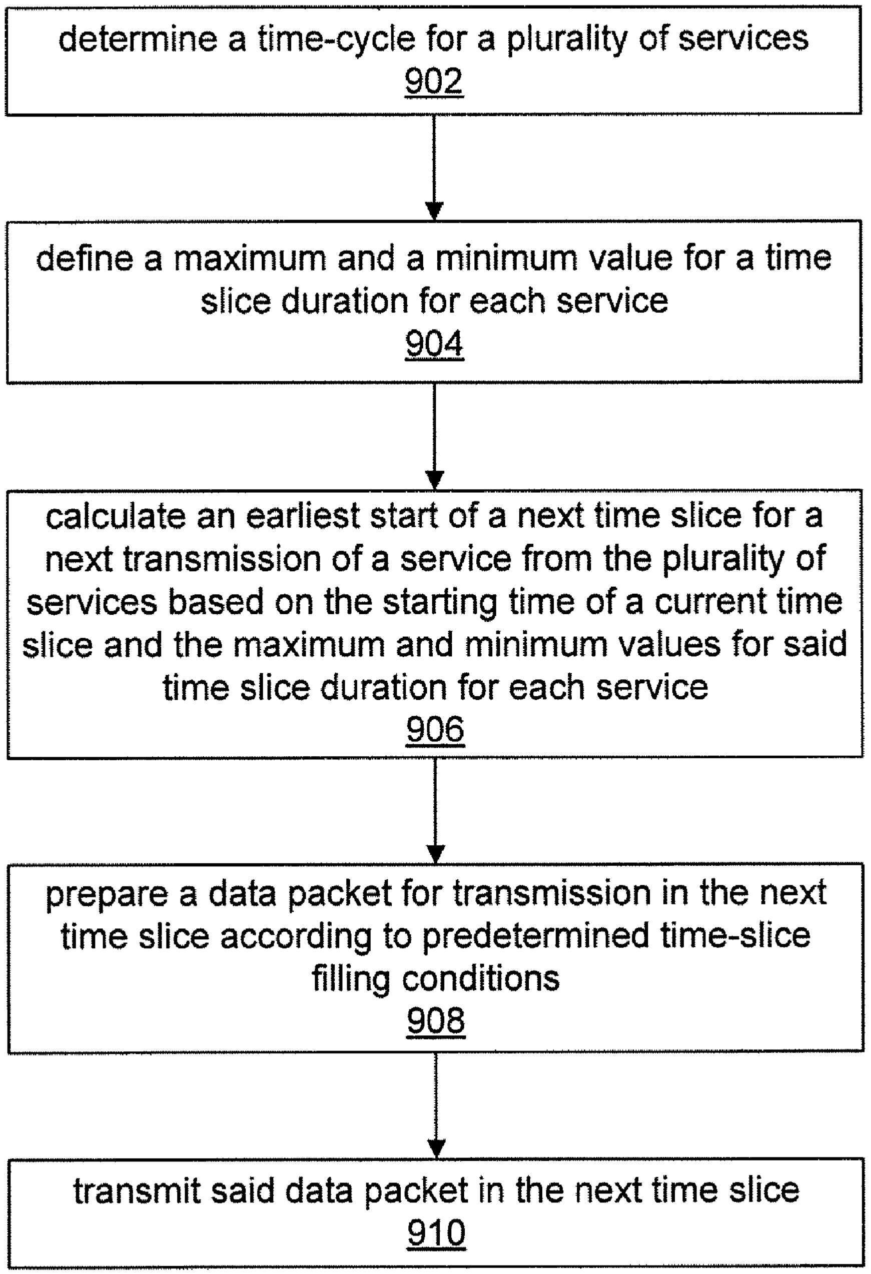
FIG. 9 is a flow diagram showing steps in accordance with an aspect of the invention.

FIG. 9 is a flow diagram showing steps in accordance with an aspect of the invention. As shown at 902, a time-cycle is determined for a plurality of services. A maximum and a minimum value for a time slice duration are defined for each service, as shown at 904. An earliest start of a next time slice for a next transmission of a service from the plurality of services is calculated based on the starting time of a current time slice and the maximum and minimum values for said time slice duration for each service, as shown at 906. A data packet is prepared for transmission in the next time slice according to predetermined time-slice filling conditions, as shown at 908. And said data packet is transmitted in the next time slice, as shown at 910.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), application specific integrated circuits (ASIC) and the like.

Embodiments of the invention include any novel feature or combination of features disclosed herein either explicitly or any generalization thereof. While embodiments of the invention have been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A method comprising:

determining a time-cycle for a plurality of services;

defining a maximum and a minimum value for a time slice duration for at least two of the services;

calculating, by a processor, an earliest start of a next time slice for a next transmission of a service from the plurality of services based on a starting time of a current time slice and the maximum and minimum values for said time slice duration for the at least two of the services;

preparing a data packet for transmission in the next time slice according to calculated time-slice filling conditions; and causing transmission of said data packet in the next time slice.

2. The method of claim 1 wherein a time until a start of a next transmission of a service is indicated in said data packet.

3. The method of claim 2 wherein the time until a start of a next transmission indicates an earliest start of a next transmission.

4. The method of claim 2 further comprising:

computing an average time slice duration as $$\overline{T}_n = \frac{R_n T}{R_1 + R_2 + \ldots + R_n + \ldots + R_N} \text{ where } \overline{T}_n$$

denotes the average time slice duration of service n, $R_n$ represents an average bit rate of service n, N stands for the number of service, and T denotes the time-cycle;

partitioning a transmission stream according to the time-cycle T;

setting $\Delta t_1 = T$, where $\Delta t_1$ denotes the time until a start of a next transmission for a first service in the time-cycle; and calculating a time until a start of a next transmission for other services in the time-cycle as:

$$\Delta t_n = (m+1)T - t_{current} + \sum_{i=1}^{n-1} \overline{T}_i - \delta_{n-1} \,\Big|\, n = 2 \ldots N,$$

where m denotes an actual time-cycle, $\delta_{n-1}$ corresponds to an uncertainty in duration of time slices of service n−1, and $t_{current}$ is a current time.

5. The method of claim 1, wherein the time-cycle is determined based on at least: channel bandwidth, average bit rate of the services, and a desired percentage of power saving for a plurality of receivers.

6. The method of claim 1, wherein defining a maximum value and a minimum value for a time slice duration further comprises: for the first service of a time-cycle, setting $T_1^{min} = \overline{T_1} - \delta_1$ and $T_1^{max} = \overline{T_1} + \delta_1$, where $T_1^{min}$ represents the minimum value for a time slice duration for the first service, $T_1^{max}$ represents the maximum value for a time slice duration for the first service, $\overline{T_1}$ represents an average time slice duration for the first service, and $\delta_1$ corresponds to uncertainty in a duration of time slices for the first service.

7. The method of claim 6, wherein defining a maximum value and a minimum value for a time slice duration further comprises: for a middle service of a time-cycle, altering the minimum value and the maximum value according to the middle service's respective start time, which depends on an end time of a previous service.

8. The method of claim 7, wherein defining a maximum value and a minimum value for a time slice duration further comprises: for a last service of a time-cycle, setting $$T_N = T_N^{min} = T_N^{max} = T - \sum_{i=1}^{N-1} T_i,$$

where $T_i$ represents the real duration of the time slice of service i.

9. The method of claim 1, wherein a Target_Time_Stamp is defined for media bit streams in a current time-slice based on the time-cycle and a previous Target_Time_Stamp in a previous time-cycle.

10. The method of claim 9, wherein data packets related to the service n are fetched to reach the Target_Time_Stamp while $T_n^{min} \leqq T_n \leqq T_n^{max}$, where $T_n^{min}$ denotes the minimum value for a time slice duration for the service n, $T_n^{max}$ denotes a maximum value for a time slice duration for the service n, and $T_n$ denotes a duration of the time slice of service n.

11. The method of claim 10, wherein, in response to determining that the fetched data packets fill the time-slice to $T_n^{max}$ and the time-stamp of last fetched packets are close to the Target_Time_Stamp, stopping the packet fetching before reaching the Target_Time_Stamp.

12. The method of claim 10, wherein, in response to determining that the fetched data packets fill the time-slice to $T_n^{max}$ and the time-stamp of last fetched packets are significantly lower than the Target_Time_Stamp, dropping a number of packets with older time-stamps and fetching more packets with newer time stamps.

13. The method of claim 12, wherein, in response to determining that the Target_Time_Stamp is reached, but the fetched data packets do not fill the time-slice to $T_n^{min}$, fetching more packets to fill the current time slice to at least $T_n^{min}$.

14. The method of claim 13, wherein, if the fetched data packets do not fill the time-slice to $T_n^{min}$ and there are no more packets in the buffer, padding is used and the minimum time-slice duration $T_n^{min}$ is used as the end of the current time slice.

15. An apparatus comprising:

a processor; and memory including computer executable instructions, the memory and the computer executable instructions configured to, with the processor, cause the apparatus to at least perform:

determine a time-cycle for a plurality of services;

define a maximum and a minimum value for a time slice duration for at least two of the services;

calculate an earliest start of a next time slice for a next transmission of a service from the plurality of services based on a starting time of a current time slice and the maximum and minimum values for said time slice duration for the at least two of the services;

prepare a data packet for transmission in the next time slice according to calculated time-slice filling conditions; and cause transmission of said data packet in the next time slice.

16. The apparatus of claim 15 wherein a time until a start of a next transmission of a service is indicated in said data packet.

17. The apparatus of claim 16 wherein the time until a start of a next transmission indicates an earliest start of a next transmission.

18. The apparatus of claim 16, wherein the memory and the computer executable instructions are further configured to, with the processor, cause the apparatus to:

compute an average time slice duration as $$\overline{T_n} = \frac{R_n T}{R_1 + R_2 + \ldots + R_n + \ldots + R_N}$$

where $\overline{T_n}$ denotes the average time slice duration of service n, $R_n$ represents an average bit rate of service n, N stands for the number of services, and T denotes the time-cycle;

partition a transmission stream according to the time-cycle T;

set $\Delta t_1 = T$, where $\Delta t_1$ denotes the time until a start of a next transmission for a first service in the time-cycle; and calculate the time until a start of a next transmission for other services in the time-cycle as:

$$\Delta t_n = (m+1)T - t_{current} + \sum_{i=1}^{n-1} \overline{T}_i - \delta_{n-1} \,\Big|\, n = 2 \ldots N,$$

where m denotes an actual time-cycle, $\delta_{n-1}$ corresponds to uncertainty in a duration of time slices of service n−1, and $t_{current}$ is a current time.

19. The apparatus of claim 15, wherein the time-cycle is determined based on at least: channel bandwidth, average bit rate of the services, and a desired percentage of power saving for a plurality of receivers.

20. The apparatus of claim 15, wherein defining a maximum value and a minimum value for a time slice duration further comprises: for the first service of a time-cycle, setting $T_1^{min} = \overline{T_1} - \delta_1$ and $T_1^{max} = \overline{T_1} + \delta_1$, where $T_1^{min}$ represents the minimum value for a time slice duration for the first service, $T_1^{max}$ represents the maximum value for a time slice duration for the first service, $\overline{T_1}$ represents an average time slice duration for the first service, and $\delta_1$ corresponds to uncertainty in the duration of time slices of the first service.

21. The apparatus of claim 20, wherein defining a maximum value and a minimum value for a time slice duration further comprises: for a middle service of a time-cycle, altering the minimum value and the maximum value according to the middle service's respective start time, which depends on the end time of a previous service.

22. The apparatus of claim 21, wherein defining a maximum value and a minimum value for a time slice duration further comprises: for the last service of a time-cycle, setting $$T_N = T_N^{min} = T_N^{max} = T - \sum_{i=1}^{N-1} T_i,$$

where $T_i$ represents the real duration of the time slice of service i, $T_N^{min}$ represents the minimum value for a time slice duration for service N, $T_N^{max}$ represents the maximum value for a time slice duration for the service N, T represents the time-cycle, and $T_N$ represents a duration of the time slice for the service N, and where N stands for the number of services.

23. The apparatus of claim 15, wherein a Target_Time_Stamp is defined for media bit streams in a current time-slice based on the time-cycle and a previous Target_Time_Stamp in a previous time-cycle.

24. The apparatus of claim 23, wherein data packets related to service n are fetched to reach the Target_Time_Stamp while $T_n^{min} \leqq T_n \leqq T_n^{max}$, where $T_n^{min}$ denotes the minimum value for a time slice duration for the service n, $T_n^{max}$ denotes the maximum value for a time slice duration for the service n, and $T_n$ denotes a duration of the time slice for the service n.

25. The apparatus of claim 24, wherein, if the fetched data packets fill the time-slice to $T_n^{max}$ and the time-stamp of last fetched packets are close to the Target_Time_Stamp, the packet fetching is stopped before reaching the Target_Time_Stamp.

26. The apparatus of claim 25, wherein, if the fetched data packets fill the time-slice to $T_n^{max}$ and the time-stamp of last fetched packets are significantly lower than the Target_Time_Stamp, a number of packets with older time-stamps are dropped and more packets with newer time stamps are fetched.

27. The apparatus of claim 26, wherein, if the Target_Time_Stamp is reached, but the fetched data packets do not fill the time-slice to $T_n^{min}$, then more packets are fetched to fill the current time slice to at least $T_n^{min}$.

28. The apparatus of claim 27, wherein, if the fetched data packets do not fill the time-slice to $T_n^{min}$ and there are no more packets in the buffer, padding is used and the minimum time-slice duration $T_n^{min}$ is used as the end of the current time slice.

29. A computer readable medium storing computer executable instructions that, when executed, cause an apparatus to at least;

determine a time-cycle for a plurality of services;

define a maximum and a minimum value for a time slice duration for at least two of the services;

calculate an earliest start of a next time slice for a next transmission of a service from the plurality of services based on a starting time of a current time slice and the maximum and minimum values for said time slice duration for the at least two of the services;

prepare a data packet for transmission in the next time slice according to calculated time-slice filling conditions; and cause transmission of said data packet in the next time slice.

30. The computer readable medium of claim 29, wherein the defining a maximum value and a minimum value for a time slice duration further comprises: for a middle service of a time-cycle, altering the minimum value and the maximum value according to the middle service's respective start time, which depends on an end time of a previous service.

* * * * *